US011192253B2

(12) United States Patent
Thackston et al.

(10) Patent No.: US 11,192,253 B2
(45) Date of Patent: Dec. 7, 2021

(54) SYSTEMS AND METHODS FOR CONDITIONAL ROBOTIC TELEOPERATION

(71) Applicant: Toyota Research Institute, Inc., Los Altos, CA (US)

(72) Inventors: Allison Thackston, San Jose, CA (US); Sam Zapolsky, San Francisco, CA (US); Katarina Bouma, Palo Alto, CA (US); Laura Stelzner, Mountain View, CA (US); Ron Goldman, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 433 days.

(21) Appl. No.: 16/159,383

(22) Filed: Oct. 12, 2018

(65) Prior Publication Data

US 2020/0114515 A1    Apr. 16, 2020

(51) Int. Cl.
*B25J 9/16* (2006.01)
(52) U.S. Cl.
CPC .......... *B25J 9/1689* (2013.01); *B25J 9/1612* (2013.01); *B25J 9/1653* (2013.01); *B25J 9/1664* (2013.01); *B25J 9/1697* (2013.01)
(58) Field of Classification Search
None
See application file for complete search history.

(56) References Cited

U.S. PATENT DOCUMENTS

| 8,761,990 | B2 | 6/2014 | Chrysanthakopoulos et al. |
| 9,278,449 | B1* | 3/2016 | Linnell ................. B25J 9/1674 |
| 9,469,031 | B2 | 10/2016 | Saito |
| 9,623,560 | B1 | 4/2017 | Theobald |
| 9,849,595 | B2 | 12/2017 | Wang et al. |
| 2011/0035050 | A1* | 2/2011 | Kim ....................... B25J 9/1666 |
|  |  |  | 700/246 |

(Continued)

FOREIGN PATENT DOCUMENTS

| JP | 2016-209953 A | 12/2016 |
| WO | 2011146259 A2 | 11/2011 |

(Continued)

OTHER PUBLICATIONS

International Search Report and Written Opinion with notification transmittal dated Jan. 29, 2020 in related International Application No. PCT/US2019/055498 (15 pages total).

(Continued)

*Primary Examiner* — Robert T Nguyen
(74) *Attorney, Agent, or Firm* — Dinsmore & Shohl LLP

(57) ABSTRACT

A method includes providing a virtual representation of an environment of a robot. The virtual representation includes an object representation of an object in the environment. The method further includes determining an attribute of the object within the environment of the robot. The attribute includes at least one of occupancy data, force data, and deformation data pertaining to the object. The method further includes receiving a user command to control the robot to move with respect to the object, and modifying a received user command pertaining to the representation of the object based upon the attribute.

15 Claims, 11 Drawing Sheets

(56) References Cited

U.S. PATENT DOCUMENTS

| | | | | |
|---|---|---|---|---|
| 2012/0197439 | A1* | 8/2012 | Wang | G05D 1/0038 |
| | | | | 700/259 |
| 2014/0163359 | A1* | 6/2014 | Sholev | A61B 1/04 |
| | | | | 600/424 |
| 2015/0298318 | A1* | 10/2015 | Wang | B25J 9/1689 |
| | | | | 700/257 |
| 2016/0113728 | A1* | 4/2016 | Piron | A61B 5/0062 |
| | | | | 606/130 |
| 2016/0229050 | A1* | 8/2016 | Wang | G06F 3/016 |
| 2017/0028561 | A1* | 2/2017 | Yamada | B25J 13/082 |
| 2017/0156715 | A1* | 6/2017 | Huang | A61B 34/30 |
| 2017/0168488 | A1 | 6/2017 | Wierzynski et al. | |
| 2017/0232615 | A1* | 8/2017 | Hammock | B23K 26/032 |
| | | | | 700/119 |
| 2017/0261962 | A1* | 9/2017 | Naitou | G05B 19/048 |
| 2017/0282375 | A1 | 10/2017 | Erhart et al. | |
| 2018/0099410 | A1 | 4/2018 | Hannya | |
| 2018/0165974 | A1* | 6/2018 | Bonkoski | G08G 5/0086 |
| 2018/0281179 | A1* | 10/2018 | Michalakis | B25J 9/1666 |
| 2021/0252709 | A1* | 8/2021 | Alspach | B25J 9/1674 |

FOREIGN PATENT DOCUMENTS

| | | |
|---|---|---|
| WO | 2014088994 A1 | 6/2014 |
| WO | 2016100235 A1 | 6/2016 |
| WO | 2018187042 A1 | 10/2018 |

OTHER PUBLICATIONS

Christopher Armbrust et al., "A behaviour-based integration of fully autonomous, semi-autonomous, and tele-operated control modes for an off-road robot", 2nd IFAC Symposium on Telematics Applications Politehnica University, Timisoara, Romania, Oct. 5-8, 2010, https://ac.els-cdn.com/S1474667015343469/1-s2.0-S1474667015343469-main.pdf?_tid=9f526fbf-6353-40cd-b8f0-97b0ae14f30b&acdnat=1528894489_d3aabcae5e79c06978522709cc71ecf7, pp. 191-196.

Communication pursuant to Rules 161(1) and 162 EPC dated May 20, 2021 in related European Application No. 19794834.2 (3 pages total).

\* cited by examiner

SYSTEMS AND METHODS FOR CONDITIONAL ROBOTIC TELEOPERATION

TECHNICAL FIELD

The present application generally relates to telematic robot control and, more particularly, filtered user inputs during teleoperation of a robot.

BACKGROUND

Users may teleoperatively control remote robots to perform a variety of tasks. The remote nature of such teleoperative remote control can introduce uncertainty for the user in operating the robot. The intended result of a command issued by the user may not be achieved, depending upon how the robot interacts with its environment after receiving the command from the user. This may result, for example, in the user experiencing less accuracy in controlling how the robot moves with respect to objects within its environment. In turn, this may result in undesirable and/or unintended interactions between the robot and its environment, despite user intentions/efforts.

Accordingly, a need exists to improve how users teleoperatively control remote robots.

SUMMARY

A method includes providing a virtual representation of an environment of a robot, wherein the virtual representation comprises an object representation of an object in the environment, determining an attribute of the object within the environment of the robot, wherein the attribute comprises at least one of occupancy data, force data, and deformation data pertaining to the object, receiving a user command to control the robot to move with respect to the object, and modifying a received user command pertaining to the representation of the object based upon the attribute.

In another embodiment, a system includes an interface component configured to provide a virtual representation of an environment of a robot, wherein the virtual representation comprises an object representation of an object in the environment. The system also includes a sensor configured to determine an attribute of the object within the environment of the robot. The attribute includes at least one of occupancy data, force data, and deformation data pertaining to the object. The system further includes a control device configured to receive user commands to control the robot. The system additionally includes a processor configured to modify a received user command pertaining to the representation of the object based upon the attribute.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to a user teleoperating a robot. More specifically, the robot may need to operate differently than instructed by the user, such that user input may need to be modified in terms of what the robot has been instructed to do. For example, the user may instruct the robot to grip an object in order to securely pick it up. However, the user may not perceive the fragility of the object, such that the user may instruct the robot to apply too much force, which may damage the object and/or the robot. To avoid this, the user's input can be delivered to the robot in a way that modifies how the robot operates in a way that differs from the user's instructions. Various embodiments of conditional robotic teleoperation are described in detail below.

Figure 1:
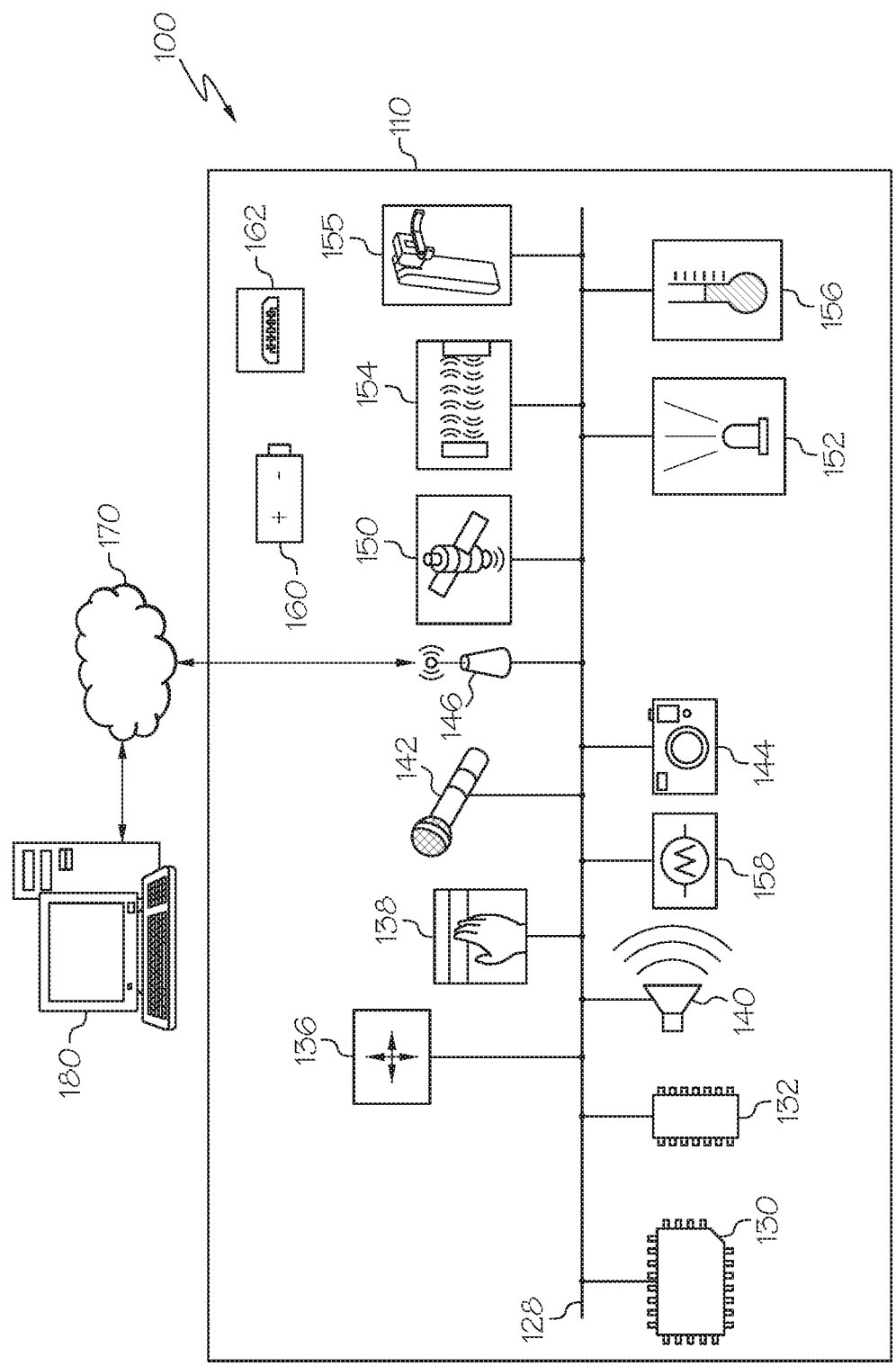
FIG. 1 is a block diagram illustrating hardware utilized in one or more robots for implementing various processes, media, and systems, according to one or more embodiments shown and described herein.

Referring now to FIG. 1, example components of one embodiment of a robot 100 are schematically depicted. The robot 100 includes a housing 110, a communication path 128, a processor 130, a memory module 132, an inertial measurement unit 136, an input device 138, an audio output device 140 (e.g., a speaker), a microphone 142, a camera 144, network interface hardware 146, a location sensor 150, a light 152, a proximity sensor 154, one or more arms 155, a temperature sensor 156, a mobility actuator 158, a battery 160, and a charging port 162. The components of the robot 100 other than the housing 110 may be contained within or mounted to the housing 110. The various components of the robot 100 and the interaction thereof will be described in detail below.

Still referring to FIG. 1, the communication path 128 may be formed from any medium that is capable of transmitting a signal such as, for example, conductive wires, conductive traces, optical waveguides, or the like. Moreover, the communication path 128 may be formed from a combination of mediums capable of transmitting signals. In one embodiment, the communication path 128 comprises a combination of conductive traces, conductive wires, connectors, and buses that cooperate to permit the transmission of electrical data signals to components such as processors, memories, sensors, input devices, output devices, and communication devices. Accordingly, the communication path 128 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 128 communicatively couples the various components of the robot 100. As used herein, the term "communicatively coupled" means that coupled components are capable of exchanging data signals with one another such as, for example, electrical signals via conductive medium, electromagnetic signals via air, optical signals via optical waveguides, and the like.

The processor 130 of the robot 100 may be any device capable of executing machine-readable instructions. Accordingly, the processor 130 may be a controller, an integrated circuit, a microchip, a computer, or any other computing device. The processor 130 is communicatively coupled to the other components of the robot 100 by the communication path 128. Accordingly, the communication path 128 may communicatively couple any number of processors with one another, and allow the components coupled to the communication path 128 to operate in a distributed computing environment. Specifically, each of the components may operate as a node that may send and/or receive data. While the embodiment depicted in FIG. 1 includes a single processor 130, other embodiments may include more than one processor.

Still referring to FIG. 1, the memory module 132 of the robot 100 is coupled to the communication path 128 and communicatively coupled to the processor 130. The memory module 132 may comprise RAM, ROM, flash memories, hard drives, or any non-transitory memory device capable of storing machine-readable instructions such that the machine-readable instructions can be accessed and executed by the processor 130. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 132. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single memory module 132, other embodiments may include more than one memory module.

The inertial measurement unit 136, if provided, is coupled to the communication path 128 and communicatively coupled to the processor 130. The inertial measurement unit 136 may include one or more accelerometers and one or more gyroscopes. The inertial measurement unit 136 transforms sensed physical movement of the robot 100 into a signal indicative of an orientation, a rotation, a velocity, or an acceleration of the robot 100. The operation of the robot 100 may depend on an orientation of the robot 100 (e.g., whether the robot 100 is horizontal, tilted, and the like). Some embodiments of the robot 100 may not include the inertial measurement unit 136, such as embodiments that include an accelerometer but not a gyroscope, embodiments that include a gyroscope but not an accelerometer, or embodiments that include neither an accelerometer nor a gyroscope.

Still referring to FIG. 1, one or more input devices 138 are coupled to the communication path 128 and communicatively coupled to the processor 130. The input device 138 may be any device capable of transforming user contact into a data signal that can be transmitted over the communication path 128 such as, for example, a button, a switch, a knob, a microphone or the like. In some embodiments, the input device 138 includes a power button, a volume button, an activation button, a scroll button, or the like. The one or more input devices 138 may be provided so that the user may interact with the robot 100, such as to navigate menus, make selections, set preferences, and other functionality described herein. In some embodiments, the input device 138 includes a pressure sensor, a touch-sensitive region, a pressure strip, or the like. It should be understood that some embodiments may not include the input device 138. As described in more detail below, embodiments of the robot 100 may include multiple input devices disposed on any surface of the housing 110. In some embodiments, an input device 138 may include force sensors to detect an amount of force being exerted by and/or upon the robot 100 and/or tactile sensors to provide a sense of touch.

The speaker 140 (i.e., an audio output device) is coupled to the communication path 128 and communicatively coupled to the processor 130. The speaker 140 transforms audio message data from the processor 130 of the robot 100 into mechanical vibrations producing sound. For example, the speaker 140 may provide to the user navigational menu information, setting information, status information, information regarding the environment as detected by image data from the one or more cameras 144, and the like. However, it should be understood that, in other embodiments, the robot 100 may not include the speaker 140.

The microphone 142 is coupled to the communication path 128 and communicatively coupled to the processor 130. The microphone 142 may be any device capable of transforming a mechanical vibration associated with sound into an electrical signal indicative of the sound. The microphone 142 may be used as an input device 138 to perform tasks, such as navigate menus, input settings and parameters, and any other tasks. It should be understood that some embodiments may not include the microphone 142.

Still referring to FIG. 1, the camera 144 is coupled to the communication path 128 and communicatively coupled to the processor 130. The camera 144 may be any device having an array of sensing devices (e.g., pixels) capable of detecting radiation in an ultraviolet wavelength band, a visible light wavelength band, or an infrared wavelength band. The camera 144 may have any resolution. The camera 144 may be an omni-directional camera, or a panoramic camera. In some embodiments, one or more optical components, such as a mirror, fish-eye lens, or any other type of lens may be optically coupled to the camera 144.

The network interface hardware 146 is coupled to the communication path 128 and communicatively coupled to the processor 130. The network interface hardware 146 may be any device capable of transmitting and/or receiving data via a network 170. Accordingly, network interface hardware 146 can include a wireless communication module configured as a communication transceiver for sending and/or receiving any wired or wireless communication. For example, the network interface hardware 146 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 146 includes hardware configured to operate in accordance with the Bluetooth wireless communication protocol. In another embodiment, network interface hardware 146 may include a Bluetooth send/receive module for sending and receiving Bluetooth communications to/from an interface device 180. The network interface hardware 146 may also include a radio frequency identification ("RFID") reader configured to interrogate and read RFID tags.

In some embodiments, the robot 100 may be communicatively coupled to an interface device 180 via the network 170. In some embodiments, the network 170 is a personal area network that utilizes Bluetooth technology to communicatively couple the robot 100 and the interface device 180. In other embodiments, the network 170 may include one or more computer networks (e.g., a personal area network, a local area network, or a wide area network), cellular networks, satellite networks and/or a global positioning system and combinations thereof. Accordingly, the robot 100 can be communicatively coupled to the network 170 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 1, as stated above, the network 170 may be utilized to communicatively couple the robot 100 with the interface device 180. As discussed in more detail below with respect to FIG. 3, the interface device 180 may include a tablet, mobile phone, a smartphone, a personal digital assistant, a camera, a dedicated mobile media player, a mobile personal computer, a wearable computing device (such as a headset for virtual reality or glasses for augmented reality), a desktop computer, a server, a laptop computer, an imaging device, and/or any other electronic device capable of being communicatively coupled with the robot 100. The interface device 180 may include one or more processors and one or more memories. The one or more processors can execute logic to communicate with the robot 100. The interface device 180 may be configured with wired and/or wireless communication functionality for communicating with the robot 100. In some embodiments, the interface device 180 may perform one or more elements of the functionality described herein, such as in embodiments in which the functionality described herein is distributed between the robot 100 and the interface device 180.

The location sensor 150 is coupled to the communication path 128 and communicatively coupled to the processor 130. The location sensor 150 may be any device capable of generating an output indicative of a location. In some embodiments, the location sensor 150 includes a global positioning system (GPS) sensor, though embodiments are not limited thereto. Some embodiments may not include the location sensor 150, such as embodiments in which the robot 100 does not determine a location of the robot 100 or embodiments in which the location is determined in other ways (e.g., based on information received from the camera 144, the microphone 142, the network interface hardware 146, the proximity sensor 154, the inertial measurement unit 136 or the like). The location sensor 150 may also be configured as a wireless signal sensor capable of triangulating a location of the robot 100 and the user by way of wireless signals received from one or more wireless signal antennas.

The mobility actuator 158 is coupled to the communication path 128 and communicatively coupled to the processor 130. As described in more detail below, the mobility actuator 158 may be or otherwise include a motorized wheel assembly that includes one or more motorized wheels that are driven by one or more motors. In other embodiments, the mobility actuator 158 may include one or more limbs (with or without joints) such as legs, arms, or anything else that may be utilized by the robot 100 for walking, crawling, swimming, self-pulling/dragging across a surface, etc. In some embodiments, limbs may include webbing or any suitable configuration and/or material that may utilized for travelling within and/or under water. In other embodiments the mobility actuator 158 may include sails, propellers, and/or turbines for underwater mobility. In still other embodiments, the mobility actuator 158 may include wings, propellers, and/or turbines for air travel/flight, which may include hovering.

The processor 130 may provide one or more drive signals to the mobility actuator 158 to, for example, actuate motorized wheels in a motorized wheel assembly such that the robot 100 travels to a desired location. This may be a location that the user wishes to acquire environmental information (e.g., the location of particular objects within at or near the desired location), or a location from which the robot 100 may move with respect to an object (such as manipulating the object and/or moving without touching the object) as desired by the user.

Still referring to FIG. 1, the light 152 is coupled to the communication path 128 and communicatively coupled to the processor 130. The light 152 may be any device capable of outputting light, such as, but not limited to, a light emitting diode, an incandescent light, a fluorescent light, or the like. Some embodiments include a power indicator light that is illuminated when the robot 100 is powered on. Some embodiments include an activity indicator light that is illuminated when the robot 100 is active or processing data. Some embodiments include an illumination light for illuminating the environment in which the robot 100 is located. Some embodiments may not include the light 152.

The proximity sensor 154 is coupled to the communication path 128 and communicatively coupled to the processor 130. The proximity sensor 154 may be any device capable of outputting a proximity signal indicative of a proximity of the robot 100 to another object. In some embodiments, the proximity sensor 154 may include a laser scanner, a capacitive displacement sensor, a Doppler effect sensor, an eddy-current sensor, an ultrasonic sensor, a magnetic sensor, an optical sensor, a radar sensor, a lidar sensor, a sonar sensor, or the like. Some embodiments may not include the proximity sensor 154, such as embodiments in which the proximity of the robot 100 to an object is determine from inputs provided by other sensors (e.g., the camera 144, the speaker 140, etc.) or embodiments that do not determine a proximity of the robot 100 to an object. One or more arms 155 may be utilized and feature any number of joints, effectuators, and the like. One or more arms 155 may be utilized and feature any number of joints, effectuators, force sensors, tactile sensors, and the like.

The temperature sensor 156 is coupled to the communication path 128 and communicatively coupled to the processor 130. The temperature sensor 156 may be any device capable of outputting a temperature signal indicative of a temperature sensed by the temperature sensor 156. In some embodiments, the temperature sensor 156 may include a thermocouple, a resistive temperature device, an infrared sensor, a bimetallic device, a change of state sensor, a thermometer, a silicon diode sensor, or the like. Some embodiments of the robot 100 may not include the temperature sensor 156.

Still referring to FIG. 1, the robot 100 is powered by the battery 160, which is electrically coupled to the various electrical components of the robot 100. The battery 160 may be any device capable of storing electric energy for later use by the robot 100. In some embodiments, the battery 160 is a rechargeable battery, such as a lithium-ion battery or a nickel-cadmium battery. In embodiments in which the battery 160 is a rechargeable battery, the robot 100 may include the charging port 162, which may be used to charge the battery 160. Some embodiments may not include the battery 160, such as embodiments in which the robot 100 is powered the electrical grid, by solar energy, or by energy harvested from the environment. Some embodiments may not include the charging port 162, such as embodiments in which the apparatus utilizes disposable batteries for power.

Figure 2:
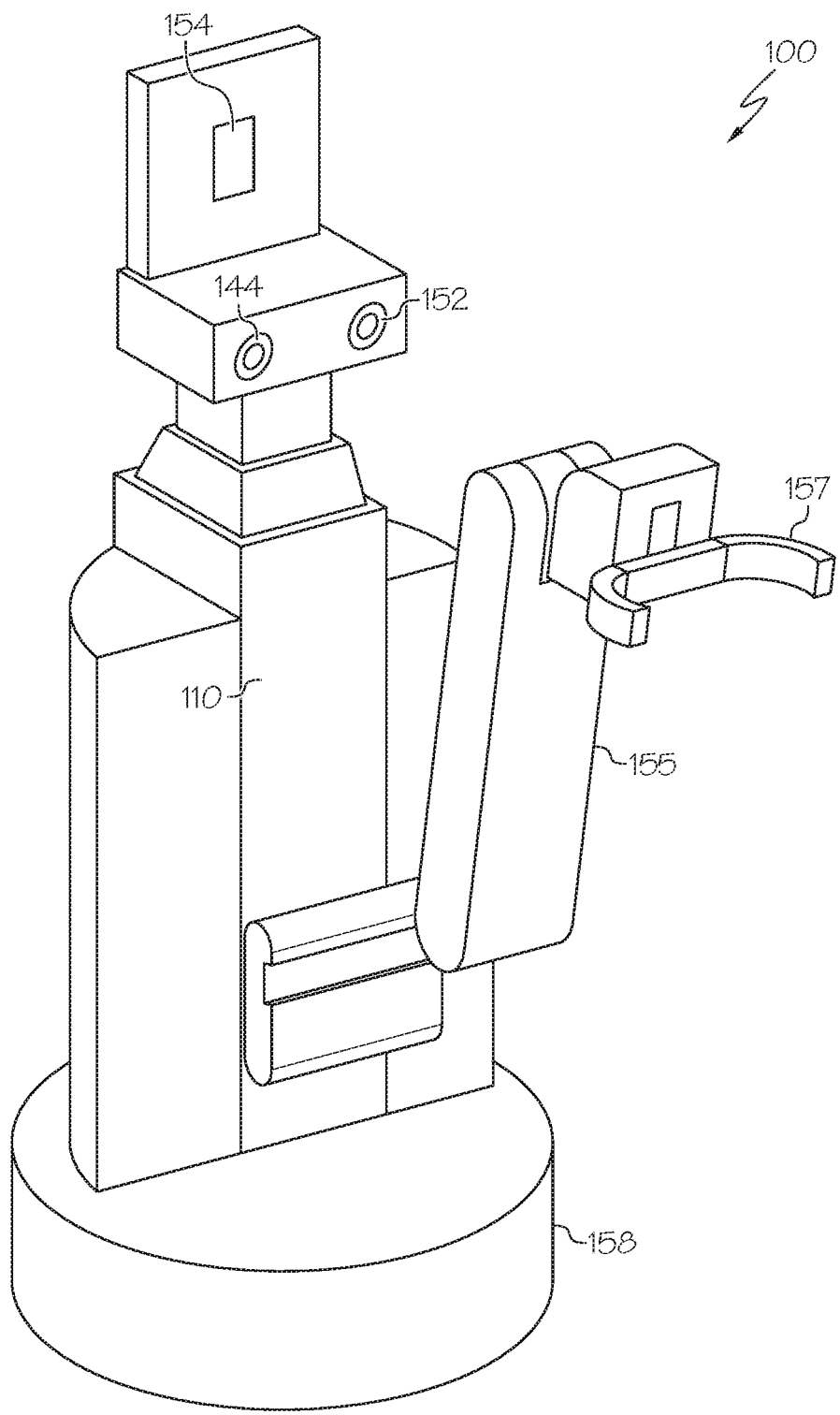
FIG. 2 schematically illustrates a top perspective view of an example robot according to one or more embodiments described and illustrated herein.

Referring now to FIG. 2, the physical configuration of the robot 100 is schematically illustrated. The robot 100 may be of any suitable size, height, weight, dimensions, etc. Generally, the robot 100 includes a housing 110, a camera 144, a light 152, and a base portion having a mobility actuator 158, which in this embodiment is a motorized wheel assembly. The robot 100 includes a proximity sensor 154 at a top portion of the robot 100 above the camera 144 and the light 152, though in other embodiments the proximity sensor 154 may be positioned at a different location. Any number of proximity sensors 154 may be provided. As described above with respect to FIG. 1, the proximity sensor 154 may generate one or more signals based on the presence of one or more objects. The proximity sensor(s) 154 may be used by the robot 100 to detect objects (e.g., anything with which the example robot 100 can interact) and/or avoid obstacles (e.g., people, furniture, stairs, walls, and the like) as it navigates within the environment, fully autonomously, partially autonomously, under user teleoperative control, or the like.

The robot 100 may feature one or more arms 155. In this embodiment, the arm 155 utilizes an interaction effectuator 157 to interact with objects, such as picking them up. Any suitable type of arm 155 may be utilized, and may feature any suitable number, configuration, and/or type of interaction effectuators 157. It should be understood that the arrangement of the components depicted in FIG. 2 is for illustrative purposes only, and that embodiments are not limited thereto. Portions of the robot 100 may be made of a material that is substantially transparent to the wavelength of the radiation detected by the camera 144 (e.g., wavelengths within the visual spectrum). Any suitable number of cameras may be utilized. In some embodiments, the camera 144 is configured to capture omni-directional image data. For example, the camera 144 may rotate about an axis to capture image data about three-hundred and sixty degrees surrounding the robot 100. Further, the camera 144 may be configured to automatically tilt up and down and/or pan left and right to capture additional image data that would otherwise be out of view if the camera 144 did not tilt up and down.

Figure 3:
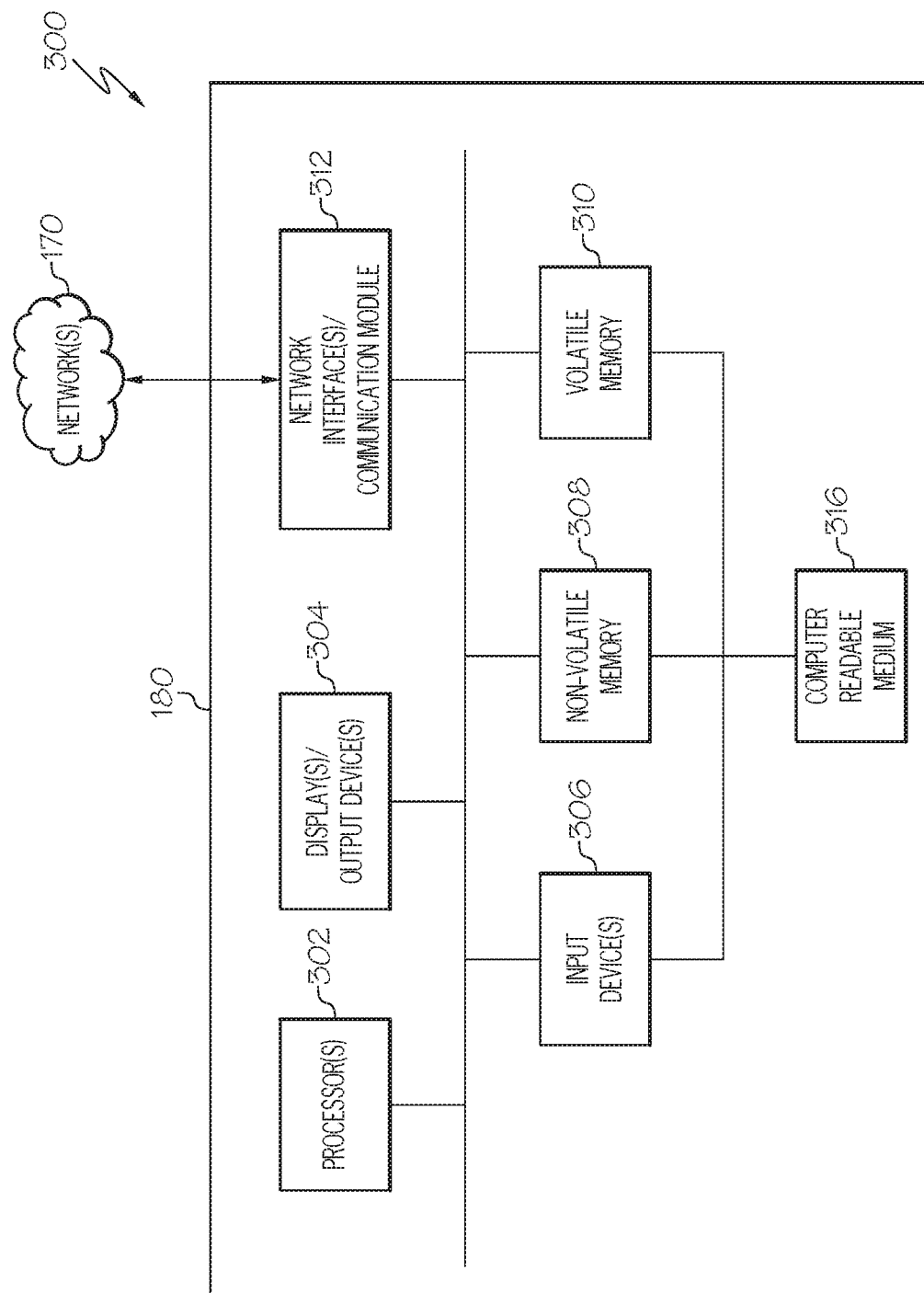
FIG. 3 is a block diagram illustrating computing hardware utilized in one or more devices for implementing various processes, media, and systems, according to one or more embodiments shown and described herein.

Turning to FIG. 3, a block diagram illustrates an exemplary computing environment 300 through which embodiments of the disclosure can be implemented, such as, for example, in the interface device 180 depicted in FIG. 1. The interface device 180 described herein is but one example of a suitable computing device and does not suggest any limitation on the scope of any embodiments presented. Nothing illustrated or described with respect to the interface device 180 should be interpreted as being required or as creating any type of dependency with respect to any element or plurality of elements. In various embodiments, an interface device 180 may include, but need not be limited to, a tablet, mobile phone, a smartphone, a personal digital assistant, a camera, a dedicated mobile media player, a mobile personal computer, a wearable computing device (such as a headset for virtual reality or glasses for augmented reality), a desktop computer, a server, a laptop computer, an imaging device, and/or any other electronic device capable of being communicatively coupled with the robot 100. An interface device 180 in some embodiments may include an interface component as well as a control device. In an embodiment, the interface device 180 includes at least one processor 302 and memory (non-volatile memory 308 and/or volatile memory 310). The interface device 180 may include non-volatile memory 308 (ROM, flash memory, etc.), volatile memory 310 (RAM, etc.), or a combination thereof. In some embodiments, the at least one processor 302 is coupled to the non-volatile memory 308 and/or volatile memory 310. The interface device 180 may utilize, by way of non-limiting example, RAM, ROM, cache, fiber optics, EPROM/Flash memory, CD/DVD/BD-ROM, hard disk drives, solid-state storage, optical or magnetic storage devices, diskettes, electrical connections having a wire, any system or device that is of a magnetic, optical, semiconductor, or electronic type, or any combination thereof.

The interface device 180 can include one or more displays and/or output devices 304 such as monitors, speakers, headphones, projectors, wearable-displays, holographic displays, and/or printers, for example. An output device 304 may be any device capable of providing tactile feedback to a user, and may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). In some embodiments, one or more output devices 304 may constitute an interface component.

The interface device 180 may further include one or more input devices 306, which can include, by way of example, any type of mouse, keyboard, disk/media drive, memory stick/thumb-drive, memory card, pen, joystick, gamepad, touch-input device, biometric scanner, voice/auditory input device, motion-detector, camera, scale, etc. In some embodiments, one or more input devices 306 may constitute a control device.

A network interface 312 can facilitate communications over a network 314 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. The interface device 180 may include one or more network interfaces 312 to facilitate communication with one or more remote devices, which may include, for example, client and/or server devices. A network interface 312 may also be described as a communications module, as these terms may be used interchangeably. Network interface 312 can be communicatively coupled to any device capable of transmitting and/or receiving data via one or more networks 170, which may correspond to the network 170 in FIG. 1. In other embodiments different networks may be accessed to facility connectivity, such that network 170 need not be or even be in direct communication with the network 170 in FIG. 1, such as where one or more other networks may serve as intermediary networks. The network interface hardware 312 can include a communication transceiver for sending and/or receiving any wired or wireless communication.

For example, the network interface hardware 312 may include an antenna, a modem, LAN port, Wi-Fi card, WiMax card, mobile communications hardware, near-field communication hardware, satellite communication hardware and/or any wired or wireless hardware for communicating with other networks and/or devices.

A computer-readable medium 316 may comprise a plurality of computer readable mediums, each of which may be either a computer readable storage medium or a computer readable signal medium. A computer readable medium 316 may reside, for example, within an input device 306, non-volatile memory 308, volatile memory 310, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media exclude propagated signals and carrier waves.

Figure 4:
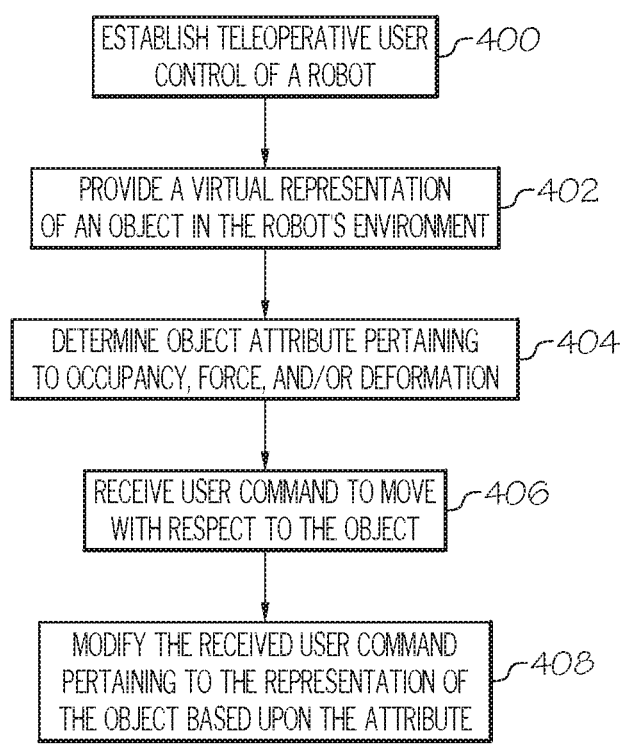
FIG. 4 illustrates a flowchart for modifying a user's command to a teleoperative robot based upon attribute associated with a virtual representation of an object in the robot's environment, according to one or more embodiments described and illustrated herein.

Turning to FIG. 4, a flowchart for modifying a user's command to a teleoperative robot based upon an attribute associated with a virtual representation of an object in the robot's environment is presented, according to one embodiment. At block 400, a teleoperative user's control of a robot may be established, such as through an input device and/or a control device (e.g. the interface device 180), along with an interface that may provide a virtual representation of an environment of a robot, such as a virtual representation displayed on a display of the one or more output devices of the interface device 180. A robot may move within the environment, move with respect to objects within the environment and/or move with respect to objects within the environment. Any suitable type of data and/or sensor(s) (such as the proximity sensor 154 discussed above) may be utilized to obtain and produce a representation of the environment of the robot, which may be referred to as a virtual representation. In this embodiment, by way of non-limiting example, the virtual representation may be a point cloud representation produced by one or more lidar sensors utilized by the robot.

At block 402, a virtual representation of the robot's actual environment (i.e., the environment) and associated objects may be provided (e.g., when displayed on one or more output devices of the interface device 180). The virtual representation may utilize modeling data. An object may be anything with which a robot is capable of observing and/or physically interacting. Virtual representations may be presented as one or more three-dimensional models of various aspects of the environment, such as rooms, walls, furniture, and the like. Virtual data may include a three-dimensional model of the environment presented to approximate what was previously recorded about the environment in which the robot presently operates. Such a three dimensional model may be a simplified version of the environment, such as where more prominent features (e.g., walls, large furniture, doorways, stairs) are provided without regard to other features (e.g., objects that are smaller, more portable, etc.). Any suitable level of detail may be utilized. In another example, a stored two dimensional image may be presented. One or more two-dimensional images representative of the robot's point of view in the environment may be utilized to approximate the environment. A view of the robot may be provided in the simulation, such as one or more robot arms 155 and/or effectuators 157 from a first-person view.

At block 404, one or more object attributes pertaining to occupancy, force, and/or deformation may be detected as pertaining to an object within the environment of the robot. For example, detection may be represented as a point cloud produced by one or more lidar sensors utilized by the robot. In other embodiments, any suitable type of data and/or sensor(s) (such as the proximity sensor 154 discussed above) may be utilized to obtain and produce a representation of the environment of the robot, which may be referred to as a virtual representation. Detection may involve an object's location, its pose (i.e., which way the object faces), and the like.

One or more object attributes pertaining to occupancy, force, and/or deformation may be determined. An object attribute (such as occupancy) may be obtained/determined, for example, by scanning the object with one or more proximity sensors 154. An object attribute may also be obtained and/or updated from an external data source, such as a database. By way of non-limiting example, an object may have one or more attribute values associated with one or more attributes retrieved from/stored in a data source and/or updated from a data source, such as a database. Continuing with this example, an object may comprise a plurality of force attributes or a plurality of deformation attributes, wherein each attribute applies to a different portion of the object. In another non-limiting example, one or more attributes may be input and/or modified by a user. For example, an attribute may be modifiable to permit a certain amount of force and/or deformation of the object, permit touching of the object, and/or all restrictions may be removed.

An attribute of an object may correspond to the spatial occupancy of that object (i.e., where the object resides and the space that it occupies). For example, the space occupied by an object in the environment of a robot may be represented by an attribute relating to the occupancy associated with the virtual representation of the object within the virtual environment. This may mean, for example, that the robot is not permitted to come into contact with the virtual representation of the object (i.e., the robot cannot touch the virtual representation of the object in the virtual environment). In some embodiments, where the virtual representation of the object may be a point cloud representation, the robot may not be permitted to come into contact with a boundary of the point cloud representing the object. This may in turn prohibit the robot from also coming into contact with any spaces between points within the virtual representation of the object. In some embodiments, occupancy may be a default attribute, such that a robot will be prohibited from contacting/touching object unless one or more object attributes are modified/updated.

An attribute related to the object may relate to an amount of force exerted upon the object, such as by a robot. For example, a minimum amount of force may be required for the robot to pick up the object. Conversely, a maximum threshold may provide for a maximum amount of force allowed to be exerted on the object in order to protect the object from being damaged (such as shattering a mug) and/or prevent damage to the robot (such as damaging a rotor within the robot's arm 155 and/or interaction effectuator 157) due to an over-exertion of force beyond the robot's capabilities. A force threshold may be based, for example, upon one or more characteristics of a robot, to limit how much force/strain can be exerted by and/or sustained by any components discussed herein relating to a robot.

An attribute may also relate to a permissible amount of deformation of the object. For example, an object such as a bean bag may be flexible, such that the bean bag may become deformed based upon a certain amount of force. However, if the bean bag becomes too deformed, such as from too much force being exerted upon on it, the bean bag could rip or otherwise become damaged and unable to return to its previous shape/state. Other objects may not be flexible but nevertheless feature a permissible amount of deformation. In this way, deforming an object that is not designed to return to its previous shape/state may be permissible insofar that the deformation does not degrade the proper functioning of the object. For example, a cylinder's exterior may be deformed due to a grip by the robot's interaction effectuator 157, but the cylinder would only be structurally damaged by deformation above a certain amount. An object may have occupancy, force, and/or deformation attributes in any combination, which may include one or more of any particular type (e.g., an occupancy attribute, two force attributes applicable to different parts of the object, and three deformation attributes applicable to three different parts of the object).

At block 406, a user command to move with respect to the object may be received. User input/commands may be include anything that the robot would be capable of performing, including by way of non-limiting example to move forward, to move in reverse, and/or to move laterally, to rotate, to increase/decrease the robot's height, and/or to utilize any hardware the robot would use for moving with respect to objects (such as with the interaction effectuator 157 and/or the motorized wheel assembly 158 depicted above with respect to FIG. 2). As discussed in more detail below with respect to FIGS. 6A-C, a robot may move with respect to an object (such as grasping a coffee cup on a table).

At block 408, the user command pertaining to the representation of the object based upon the attribute (pertaining to the object's representation) may be modified. The user command may be modified at any point to prevent the execution of the user's command as-issued. As used herein, modification of a user command may refer to either changing the user command or preventing the robot from executing the command. For example, the user command may be modified before being output by the interface device 180 to the robot. In another example, the processor 130 of the robot, having access to object attributes, may modify user commands. In yet another example, any suitable device in a communication path between the interface device 180 and the robot may modify user commands. Based upon an occupancy attribute of the object, the robot may reach around or move around the object in order to avoid violating the occupancy attribute. In some embodiments, the object may be a hazard, such that modifying a user command further comprises modifying the orientation or path of a robot. For example, if the object is a hazard such as a hole in the ground, the robot may navigate around the hole by having its path and/or orientation modified, despite a user command to continue on a path where the robot could fall into the hole. Some embodiments may include conditional teleoperation for navigation. For example, a user could command the robot to navigate to a specific position that could cause the robot to collide with an obstacle in the environment (e.g., a wall, coffee table). To prevent this, the command may be modified to allow the robot to get close to the commanded position while staying a safe distance away from the obstacle. In another embodiment, user commands may instruct the robot to drive through a doorway in a way that could cause the robot to collide with the door jam, such that the user command is modified so the robot can safely pass through the doorway.

In another example, where the object has a force attribute, the robot does not exert more force than the force limit threshold specified by the force attribute, despite a user command to exert greater force. In yet another example, where the object has a deformation attribute, the robot will not deform the object more than is permitted by the deformation attribute, despite a user command to continue deforming the object. By way of non-limiting example, object deformation may be observed by a robot's camera 144 and/or a proximity sensor 154 (such as a lidar sensor), where the robot's processor 130 may determine the amount of deformation occurring to the object for comparison with the object's associated deformation attribute. In another example, the amount of deformation may be detected by the grip of the interaction effectuator 157, such that a cylinder's deformation is measured based upon the grip closing tighter than the circumference of the cylinder, thus measurably shrinking the cylinder's circumference and deforming the cylinder.

Figure 5:
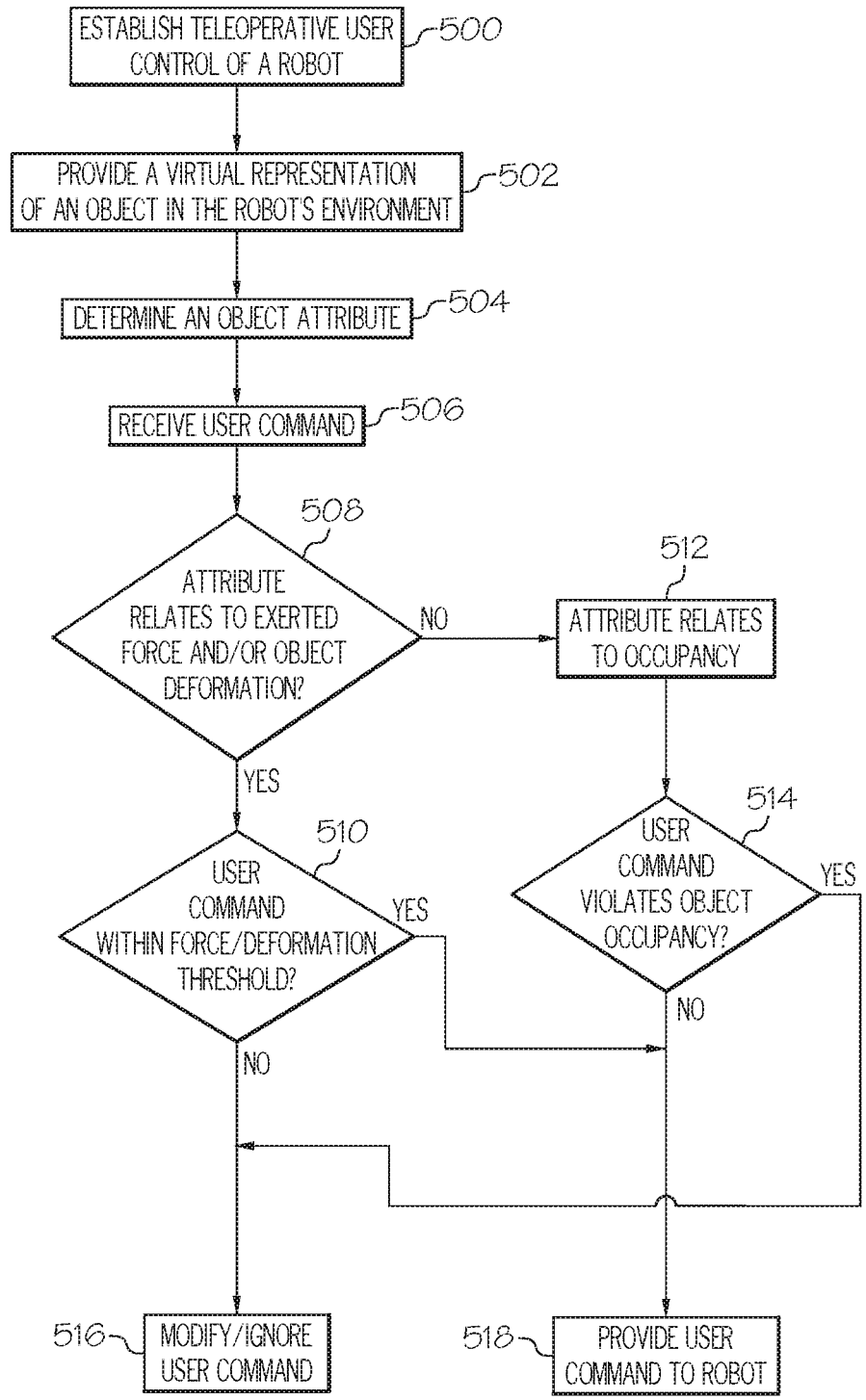
FIG. 5 illustrates a flowchart for modifying a user's command to a teleoperative robot based upon an attribute associated with a virtual representation of an object in the robot's environment, where the attribute is an occupancy attribute, force attribute, or a deformation attribute whose threshold is exceeded, according to one or more embodiments described and illustrated herein.

Turning to FIG. 5, a flowchart for updating an object's expected property and recalibrating a sensor based upon a discrepancy between the detected location/pose of an object and the expected location/pose of the object is presented, according to one embodiment. At block 500, teleoperative user control of a robot may be established. At block 502, a virtual representation of the robot's environment and associated objects may be provided utilizing modeling data. Virtual representations may be presented as one or more three-dimensional models of various aspects of the environment, such as rooms, walls, furniture, and the like. In other embodiments, two dimensional data such as camera images and/or a two dimensional environment map may be utilized. At block 504, an object attribute may be determined, as discussed above with respect to FIG. 4. At block 506, a user command to move with respect to the object may be received. It should be noted that block 506 may occur before block 504 and is only depicted in this order as an illustrative example.

At block 508, a determination is made as to whether the attribute relates to object deformation. If so (yes at block 508), then the method proceeds to block 510. If not (no at block 508), then at block 512 it is determined that the attribute relates to occupancy, and then at block 514 a determination is made as to whether a user command violates object occupancy. If the user command violates the object's occupancy attribute at block 514 (yes at block 514), then at block 516 the user command may be modified or ignored in order to avoid having the robot actually violate the object's occupancy attribute. Otherwise, if the user command does not violate the object's occupancy attribute (no at block 514), then at block 518 the user command may be provided to the robot. Returning to block 510, if the user command is within a force or deformation threshold (yes at block 510), then at block 518 the user command may be provided to the robot. For example, an object attribute may comprise deformation data utilizing a deformation threshold corresponding to an amount that the object may be deformed by force exerted by the robot. Otherwise, if the user command violates a force threshold (as part of a force attribute) and/or a deformation threshold (as part of a deformation attribute) at block 510 (no at block 510), then at block 516 the user command may be modified or ignored.

Figure 6A:
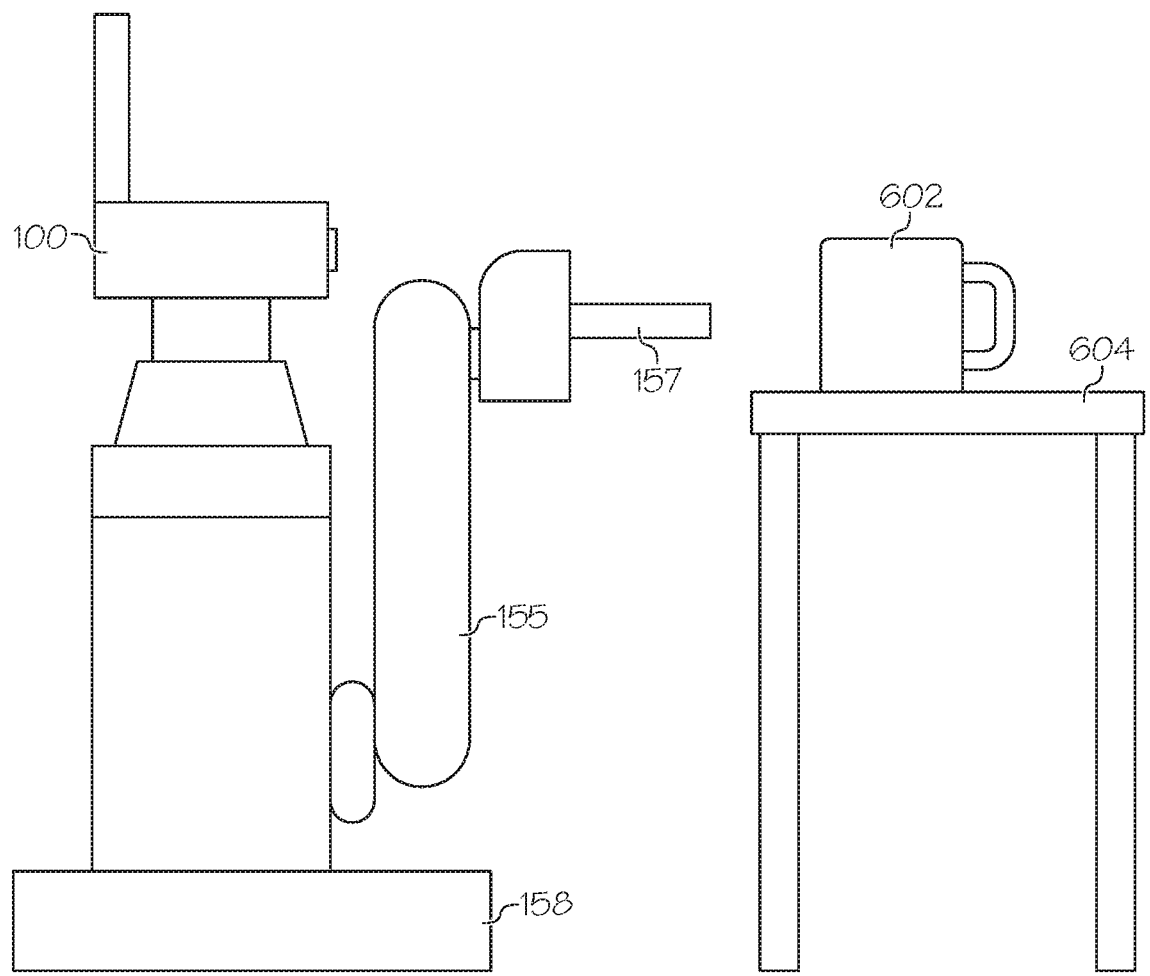
FIG. 6A illustrates a side view of a robot near an object, according to one or more embodiments shown and described herein.

Turning to FIG. 6A, a side view 600A of a robot 100 near an object 602 is presented, according to one embodiment. Although depicted as a pincer, an interaction effectuator 157 may be anything (such as a hand, claw, flat/pointed/curved surface, blade, tentacle, rod, an appendage and the like) associated with the robot 100 that is capable of interacting with an object 602. The object 602, although depicted here as a mug, may be anything with which a robot 100 can interact.

Figure 6B:
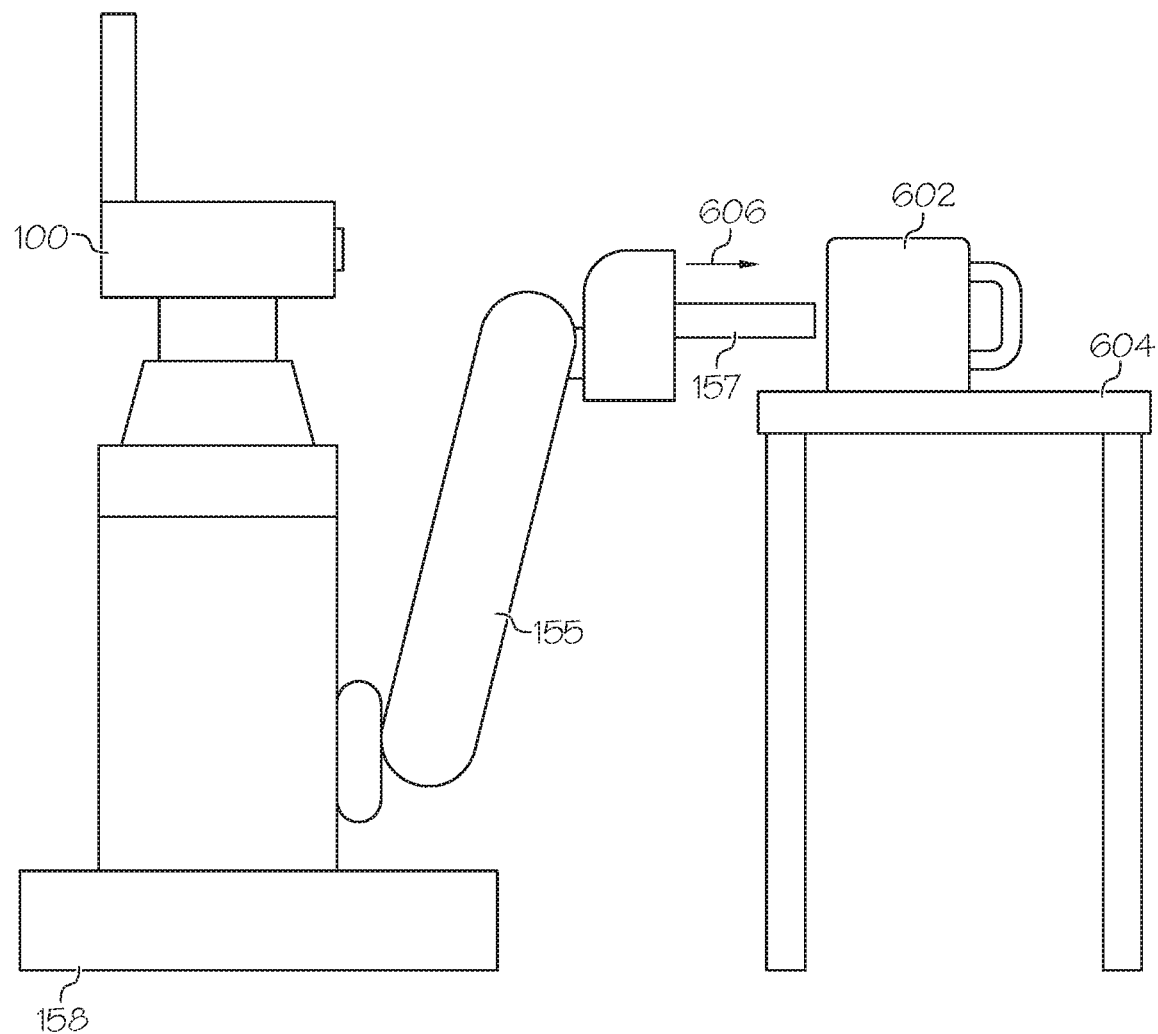
FIG. 6B illustrates a subsequent side view of the robot as it begins to receive a command from the user to move with respect to the object, according to one or more embodiments shown and described herein.

Turning to FIG. 6B, a subsequent side view 600B of the robot 100 is presented as it receives a user command 606 to move with respect to (e.g., grab) the object 602, according to one embodiment. As shown, the interaction effectuator 157 and arm 155 approach the object 602, thus complying with the user command 606.

Figure 6C:
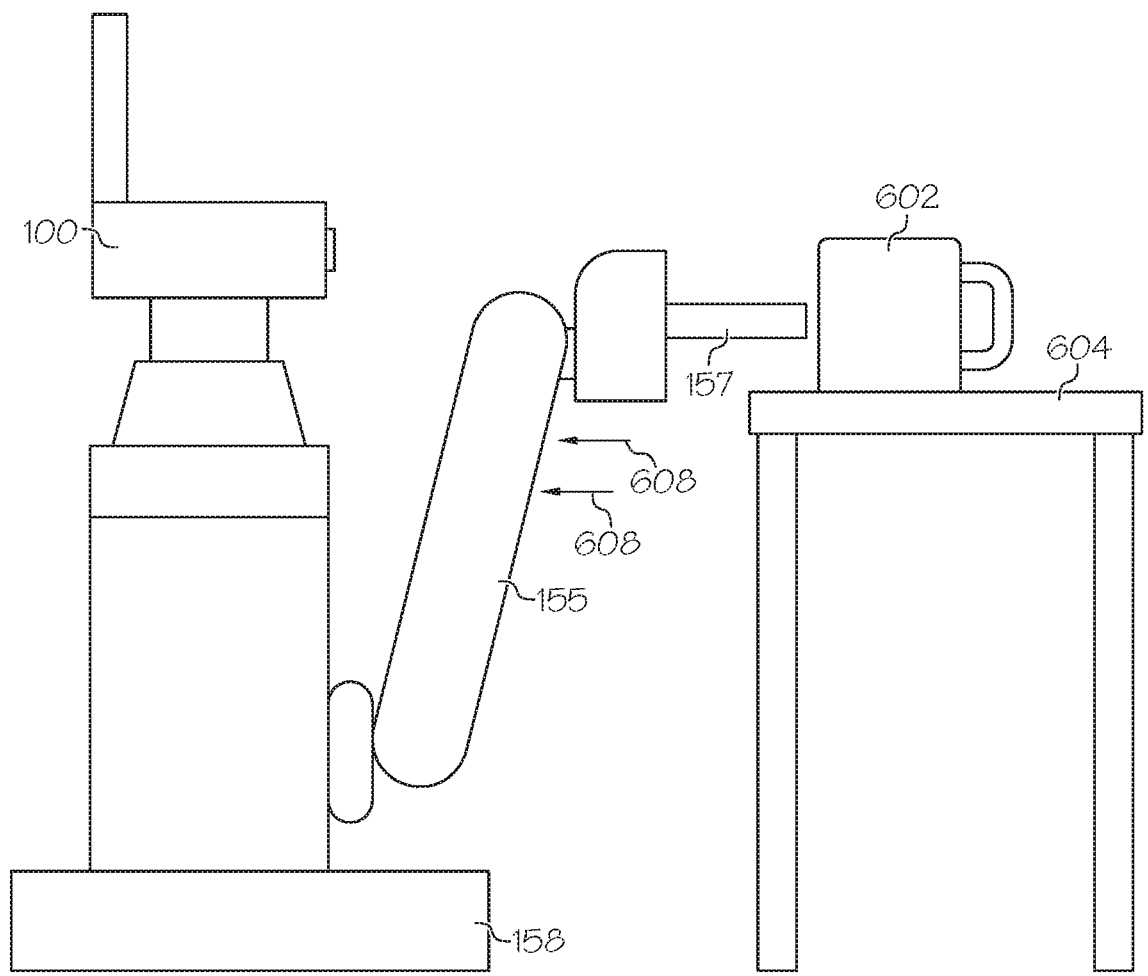
FIG. 6C illustrates a subsequent side view of the robot as it receives a modified version of the command that prevents the robot from moving with respect to the object, according to one or more embodiments shown and described herein.

Turning to FIG. 6C, a subsequent side view 600C of the robot 100 as it receives a modified version of the command 608 that prevents the robot 100 from moving with respect to the object 602 is presented, according to one embodiment. Here, an occupancy attribute results in a modified command 608 that directs the robot 100 halt the movement of its interaction effectuator 157 and arm 155 toward the object 602, in order to avoid contact that would violate the occupancy attribute. For example, the object 602 in this example is a mug which may be particularly fragile and could shatter, may be easily tipped over on the table 604, or may otherwise be knocked off of the table 604.

Figure 7A:
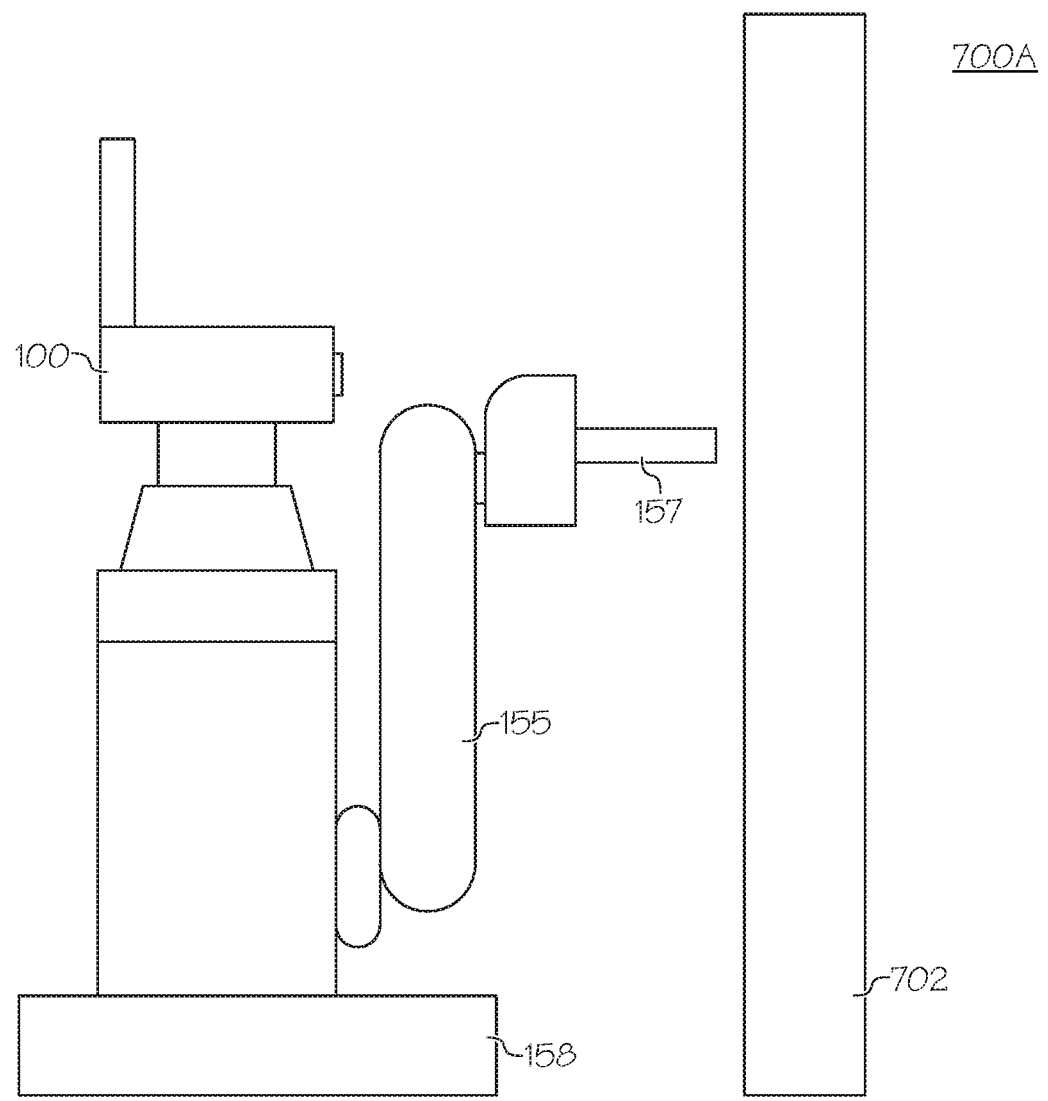
FIG. 7A illustrates a side view of a robot approaching an object, according to one or more embodiments described and illustrated herein.

Turning to FIG. 7A, a side view 700A of a robot 100 near an object 702 is presented, according to one embodiment. In this embodiment, the object 702 does not have an occupancy attribute. Although depicted as a cylinder, the object 702 may be anything with which the robot 100 can interact.

Figure 7B:
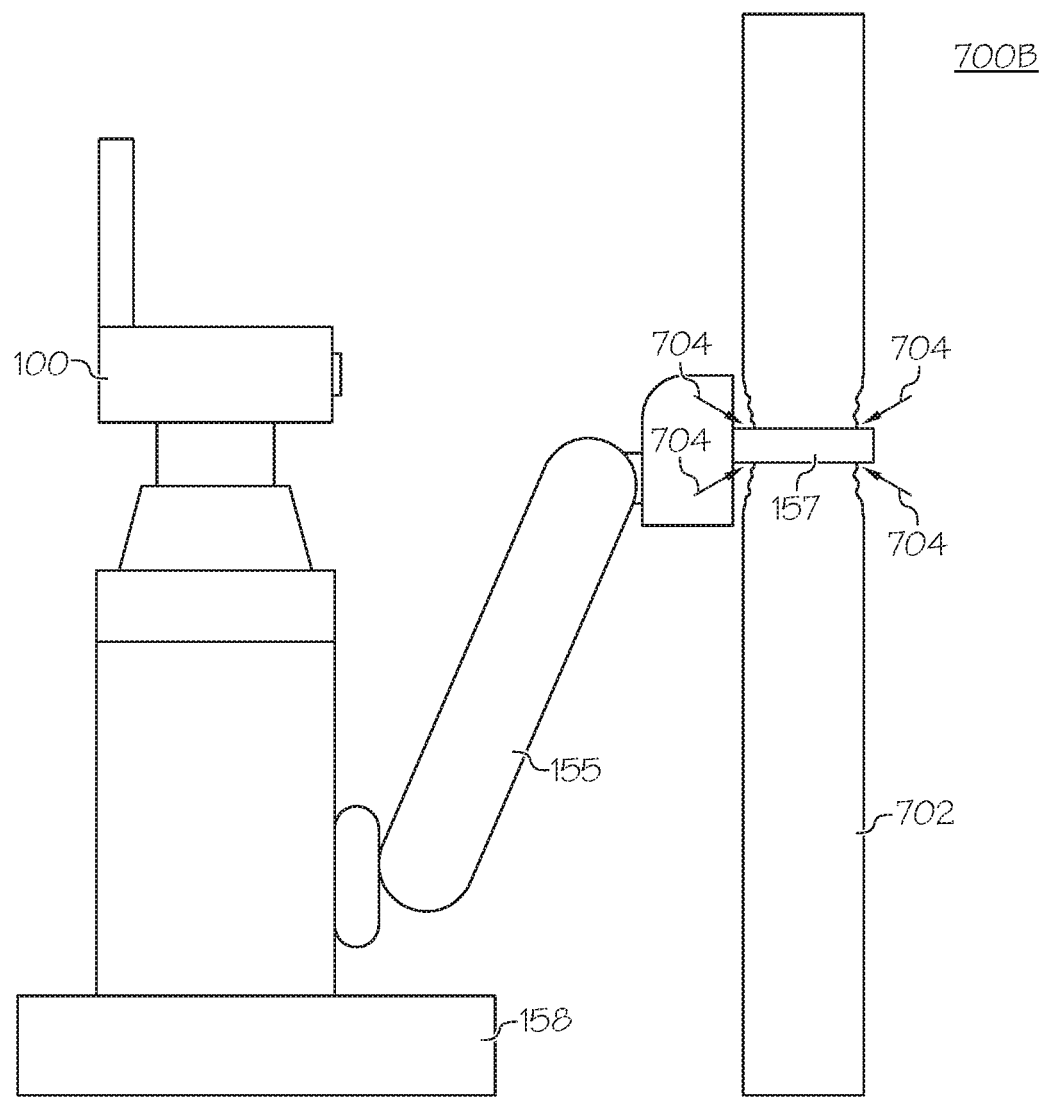
FIG. 7B illustrates a subsequent side view of the robot as it begins to execute a user command that results in deformation of the object, according to one or more embodiments described and illustrated herein.

Turning to FIG. 7B, a subsequent side view 700B of the robot 100 as it begins to execute a user command that results in deformation of the object 702 is presented, as depicted in FIG. 7A, according to one embodiment. Here a user command 704 directs the robot 100 to grip and/or squeeze the object 702, where the object becomes deformed as a result.

Figure 7C:
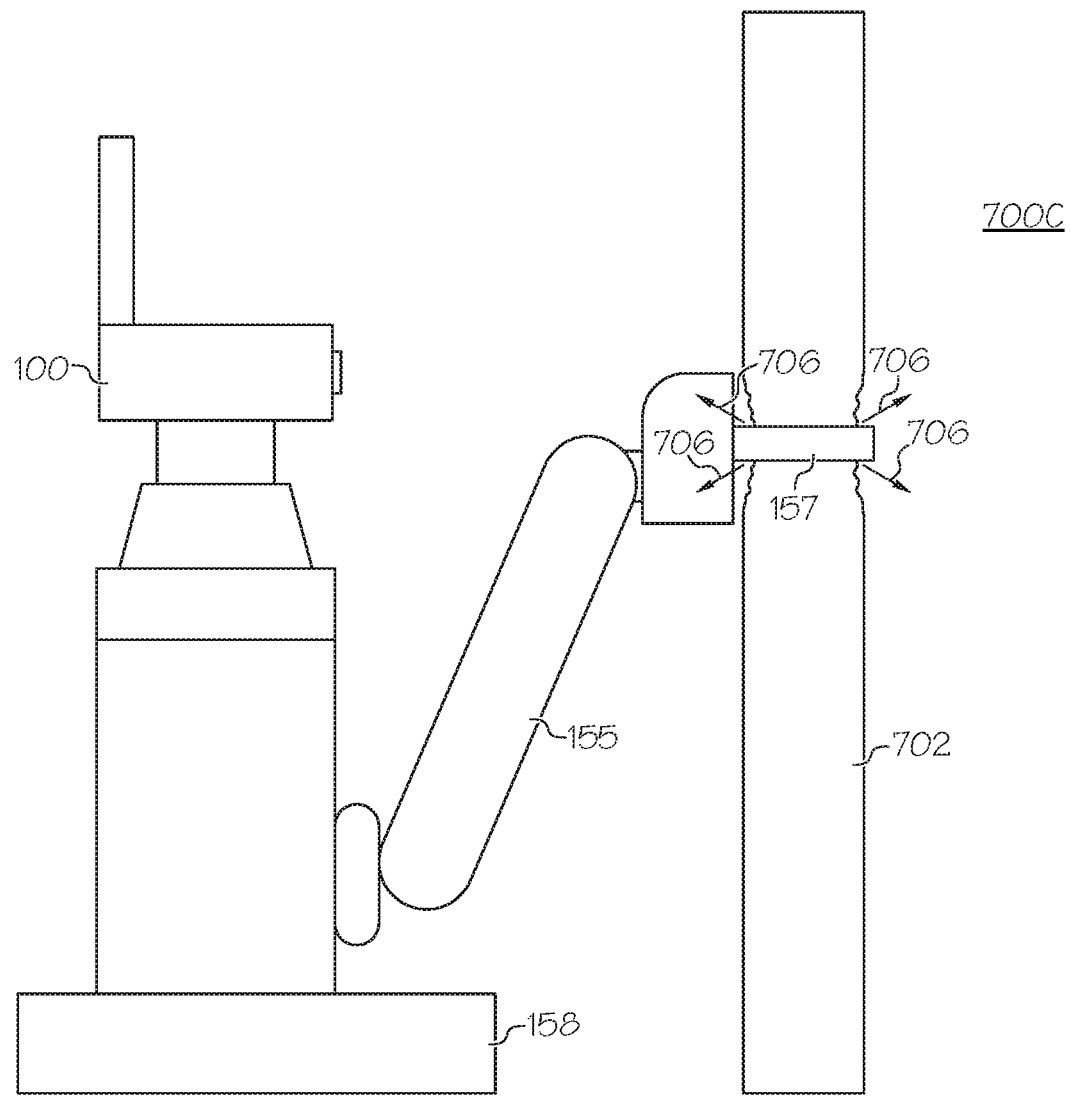
FIG. 7C illustrates a subsequent side view of the robot as it receives a modified version of the command that prevents the robot from further deforming the object, according to one or more embodiments described and illustrated herein.

Turning to FIG. 7C, a subsequent side view 700C of the robot 100 is depicted as it receives a modified version of the user command 706 that prevents it from further deforming the object 702, according to one embodiment. Continuing with this embodiment, the object 702 has a deformation attribute, such that although the amount of force provided by the user command has not increased, the amount of deformation of the object 702 has approached or exceeded a deformation threshold of the object 702, and therefore the user command is overridden with a modified user command 706 that stops the robot 100 from squeezing the object 702. In another embodiment, a force attribute may be utilized to impose a force threshold such that the robot would not be able to increase its squeezing force to be able to further deform the object 702, depending upon one or more constituent materials of the object.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:
1. A method comprising:
   providing a virtual representation of an environment of a robot, wherein the virtual representation comprises an object representation of an object in the environment;

determining an attribute of the object within the environment of the robot, wherein the attribute comprises deformation data utilizing a deformation threshold corresponding to an amount that the object may be deformed by force exerted by the robot;

receiving user commands to control the robot; and modifying a received user command pertaining to the virtual representation of the object based upon the attribute.

2. The method of claim 1 wherein the virtual representation is a point cloud representation.

3. The method of claim 1 wherein the object further comprises a plurality of deformation attributes, wherein each attribute applies to a different portion of the object.

4. The method of claim 1 wherein the object is a hazard and modifying the user command further comprises modifying the orientation or path of the robot.

5. The method of claim 1 further comprising modifying the user command to prevent the execution of the user command.

6. The method of claim 1, further comprising modifying the user command before being sent to the robot to prevent the robot from executing the command.

7. The method of claim 1, further comprising:

utilizing a second attribute comprising a force threshold to limit an amount of force exerted by the robot upon the object; and utilizing a third attribute of the object comprising occupancy data prohibiting contact with the object.

8. The method of claim 1 further comprising receiving the attribute from an external database.

9. A system comprising:

an interface component configured to provide a virtual representation of an environment of a robot, wherein the virtual representation comprises an object representation of an object in the environment;

a sensor configured to determine an attribute of the object within the environment of the robot, wherein the attribute comprises deformation data utilizing a deformation threshold corresponding to an amount that the object may be deformed by force exerted by the robot;

a control device configured to receive user commands to control the robot; and a processor configured to modify a received user command pertaining to the representation of the object based upon the attribute.

10. The system of claim 9 wherein the virtual representation is a point cloud representation.

11. The system of claim 9 wherein the object comprises a plurality of deformation attributes, wherein each attribute applies to a different portion of the object.

12. The system of claim 9 wherein the object is a hazard and modifying the user command further comprises modifying the orientation or path of the robot.

13. The system of claim 9 wherein the processor is further configured to modify the user command before being sent to the robot to prevent the robot from executing the command.

14. The system of claim 9, further comprising:

a second attribute comprising a force threshold to limit an amount of force exerted by the robot upon the object; and a third attribute of the object comprising occupancy data prohibiting contact with the object.

15. The system of claim 9, wherein the processor is further configured to receive the attribute from an external database.

* * * * *

UNITED STATES PATENT AND TRADEMARK OFFICE
CERTIFICATE OF CORRECTION

| | |
|---|---|
| PATENT NO. | : 11,192,253 B2 |
| APPLICATION NO. | : 16/159383 |
| DATED | : December 7, 2021 |
| INVENTOR(S) | : Allison Thackston et al. |

It is certified that error appears in the above-identified patent and that said Letters Patent is hereby corrected as shown below:

In the Claims

In Column 15, Line(s) 10, Claim 2, after "claim 1", insert --,--.

In Column 15, Line(s) 12, Claim 3, after "claim 1", insert --,--.

In Column 15, Line(s) 15, Claim 4, after "claim 1", insert --,--.

In Column 15, Line(s) 18, Claim 5, after "claim 1", insert --,--.

In Column 15, Line(s) 30, Claim 8, after "claim 1", insert --,--.

In Column 16, Line(s) 13, Claim 10, after "claim 9", insert --,--.

In Column 16, Line(s) 15, Claim 11, after "claim 9", insert --,--.

In Column 16, Line(s) 18, Claim 12, after "claim 9", insert --,--.

In Column 16, Line(s) 21, Claim 13, after "claim 9", insert --,--.

Signed and Sealed this
Seventeenth Day of May, 2022

Katherine Kelly Vidal
*Director of the United States Patent and Trademark Office*